United States Patent [19]
Farwell

[11] Patent Number: 5,413,237
[45] Date of Patent: May 9, 1995

[54] NONFRAGMENTING RUPTURE DISK ASSEMBLIES AND METHODS

[75] Inventor: Stephen P. Farwell, Owasso, Okla.

[73] Assignee: BS&B Safety Systems, Inc., Tulsa, Okla.

[21] Appl. No.: 263,374

[22] Filed: Jun. 20, 1994

[51] Int. Cl.⁶ ............................................. B65D 25/00
[52] U.S. Cl. ................................... 220/89.2; 137/68.1
[58] Field of Search .................. 220/89.1, 89.2, 89.3, 220/207; 137/68.1, 70

[56] References Cited

U.S. PATENT DOCUMENTS

| | | | |
|---|---|---|---|
| 4,158,422 | 6/1979 | Witten et al. | 220/89 A |
| 4,236,648 | 12/1980 | Wood et al. | 220/89 A |
| 4,404,982 | 9/1983 | Ou | 137/68 R |
| 4,759,460 | 7/1988 | Mozley | 220/89 A |
| 5,082,133 | 1/1992 | Farwell et al. | 220/89.2 |
| 5,167,337 | 12/1992 | Short, III et al. | 220/89.2 |

*Primary Examiner*—Joseph Man-Fu Moy
*Attorney, Agent, or Firm*—Dougherty, Hessin, Beavers & Gilbert

[57] ABSTRACT

Nonfragmenting rupture disk assemblies and methods are provided. The assemblies basically comprise an inlet rupture disk supporting member for communicating fluid pressure to said rupture disk, an outlet rupture disk supporting member including a pressure relieving fluid flow passageway therethrough, a rupture disk sealingly clamped between the inlet and outlet supporting members which forms a hinged blow-out portion that is folded into the outlet supporting member upon pressure relieving rupture and fluid flow through the ruptured disk, and catching means disposed in the outlet supporting member for catching the leading edge of the blow-out portion as it is folded into the outlet supporting member thereby preventing fragmentation of the blow-out portion.

30 Claims, 2 Drawing Sheets

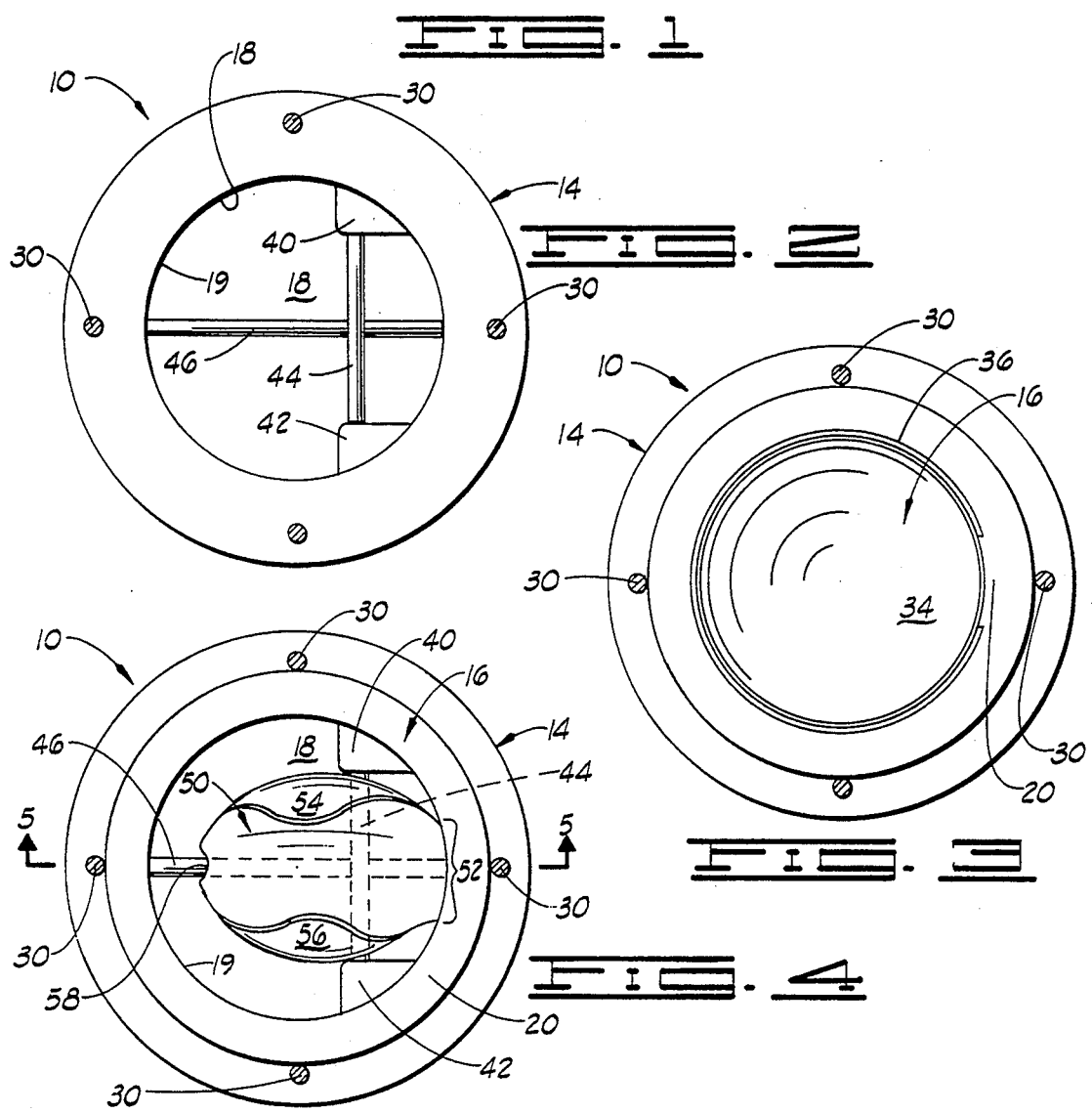

NONFRAGMENTING RUPTURE DISK ASSEMBLIES AND METHODS

BACKGROUND OF THE INVENTION

1. Field of the Invention

This invention relates generally to nonfragmenting rupture disk assemblies and methods, and more particularly, to improved such assemblies and methods wherein the rupture disk ruptures into a hinged blow-out portion which is caught and prevented from moving and tearing by pressure relieving fluid flow.

2. DESCRIPTION OF THE PRIOR ART

A variety of safety pressure relieving assemblies of the rupture disk type have been developed and used heretofore. Generally, the assemblies include a rupture disk supported between inlet and outlet supporting members, the inlet supporting member being connected to a relief connection of a vessel or system containing fluid pressure. When the fluid pressure within the vessel or system exceeds the design rupture pressure of the disk, the disk ruptures causing fluid pressure to be relieved from the vessel or system through the ruptured disk and the outlet supporting member.

Various types of rupture disks have heretofore been used including rupture disks which are formed of single parts and composite rupture disks formed of several parts. For example, single part rupture disks which are flat or which include domed portions have commonly been used heretofore. Composites of such rupture disks and other complimentary components such as vacuum supports and disk cutting members have also commonly been used.

Domed rupture disks generally include a central concave-convex portion. Domed rupture disks in which the concave sides of the disks are exposed to fluid pressure are commonly known as "conventional" rupture disks. Conventional rupture disks are placed in tension by the force of the fluids under pressure exerted thereon, and rupture occurs when the tensile strength of the disk material is exceeded. Domed rupture disks in which the convex sides of the disks are exposed to fluid pressure are known as "reverse buckling" disks. Reverse buckling rupture disks are placed in compression by the fluid pressure exerted thereon, and typically, when the design rupture pressure of the disk is exceeded, the concave-convex portion first reverses itself and then ruptures.

Cutting members including cutting edges of various configurations have been utilized with composite reverse buckling rupture disks to puncture the disks upon reversal and bring about the full opening thereof. For example, U.S. Pat. No. 4,236,648, assigned to the assignee of this present invention, which is incorporated herein by reference for purposes of disclosure, is directed to a composite rupture disk comprised of a reverse buckling rupture disk attached to a cutting member which includes a partially circular cutting edge. Upon reversal of the reverse buckling rupture disk, the cutting edge is contacted by the disk which severs the disk and forms a hinged blow-out portion therein.

One or more lines of weakness formed by scores or grooves which define one or more blow-out portions have been utilized in both conventional and reverse buckling rupture disks. The blow-out portions can take a variety of configurations and can be hinged to the remainder of the disks by areas not including lines of weakness. Upon rupture, the disks tear along the lines of weakness whereby the fragmentation of the disks is substantially prevented.

While the heretofore utilized rupture disk assemblies have been successfully used in a great number of applications, problems are still encountered. A particular such problem involves the fragmentation of the blow-out portions of the disks due to the pressure relieving fluid flow through the ruptured disks and the outlet supporting members which imparts a whipping action to the blow-out portions. The whipping action in turn causes pieces of the blow-out portions to fragment or sever which can damage or contaminate downstream processes and/or equipment into which the fragments are carried.

A number of solutions to this fragmentation problem have been proposed and utilized substantially successfully. For example, U.S. Pat. No. 5,167,337, which is assigned to the assignee of the present invention and which is incorporated herein by reference for purposes of disclosure, is directed to a rupture disk assembly including a reverse buckling rupture disk having a line of weakness formed by a C-score therein which defines a hinged blow-out portion. A rupture disk hinge supporting surface is provided which extends into the concave portion of the rupture disk and functions to slow the rupture process and to support the hinge area whereby tearing and fragmentation of the blow-out portion does not occur.

U.S. Pat. No. 5,005,722, also assigned to the assignee of this present invention and incorporated herein by reference for purposes of disclosure, is directed to a reverse buckling C-scored rupture disk assembly which includes a notch removed from a portion of the inlet supporting member to cause disk failure at reduced pressures when the assembly is inadvertently installed upside down. In addition, the assembly includes a hinge supporting member to prevent fragmentation of the C-shaped blow-out portion produced when the rupture disk ruptures during normal operation.

While the above described rupture disk assemblies and other prior art assemblies have been utilized successfully to reduce the incidence of fragmentation, some fragmentation still occurs as a result of the blow-out portions of the rupture disks still being subjected to the above mentioned whipping action. The incidence of such fragmentation increases as the size of the rupture disk increases and the design rupture pressure thereof decreases. That is, a large diameter, low pressure rupture disk is more likely to produce such fragmentation upon rupture than is a smaller higher pressure disk. This is because upon rupture, the blow-out portion of a large diameter, low pressure rupture disk which is formed of thin material, is readily moved and whipped about by the pressure relieving fluid flow through the ruptured disk and the outlet supporting member.

Thus, there is a need for improved nonfragmenting rupture disk assemblies and methods which prevent the above mentioned whipping action and the fragmentation incident thereto.

SUMMARY OF THE INVENTION

The present invention provides improved nonfragmenting rupture disk assemblies and methods which meet the need described above and overcome the shortcomings of the prior art.

The nonfragmenting rupture disk assemblies of this invention are basically comprised of an inlet rupture disk supporting member for communicating fluid pressure to a rupture disk, an outlet rupture disk supporting member including a pressure relieving fluid flow passageway therethrough, a rupture disk sealingly clamped between the inlet and outlet supporting members which forms a hinged blow-out portion that is folded into the outlet supporting member upon pressure relieving rupture and fluid flow through the rupture disk, and catching means disposed in the outlet supporting member for catching the leading edge of the blow-out portion as it is folded into the outlet supporting member whereby the subsequent movement and tearing of the blow-out portion as a result of pressure relieving fluid flow through the ruptured disk and outlet supporting member is prevented.

The methods of the invention for preventing fragmentation of a rupture disk supported between inlet and outlet supporting members basically comprise the steps of rupturing the rupture disk into a hinged blow-out portion which is folded into the outlet supporting member and catching the leading edge of the blow-out portion as the blow-out portion is folded into the outlet supporting member whereby the blow-out portion is prevented from moving and tearing as a result of the pressure relieving fluid flow through the ruptured disk and through the outlet supporting member.

It is, therefore, a general object of the present invention to provide improved nonfragmenting rupture disk assemblies and methods.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a side, partly sectional view of a nonfragmenting rupture disk assembly of the present invention.

FIG. 2 is a view taken along line 2—2 of FIG. 1.

FIG. 3 is a partly cross-sectional view taken along line 3—3 of FIG. 1.

FIG. 4 is a partly cross-sectional view similar to FIG. 3, but showing the rupture disk after the initial rupture and bending thereof.

DETAILED DESCRIPTION OF THE PREFERRED EMBODIMENTS

Figure 5:
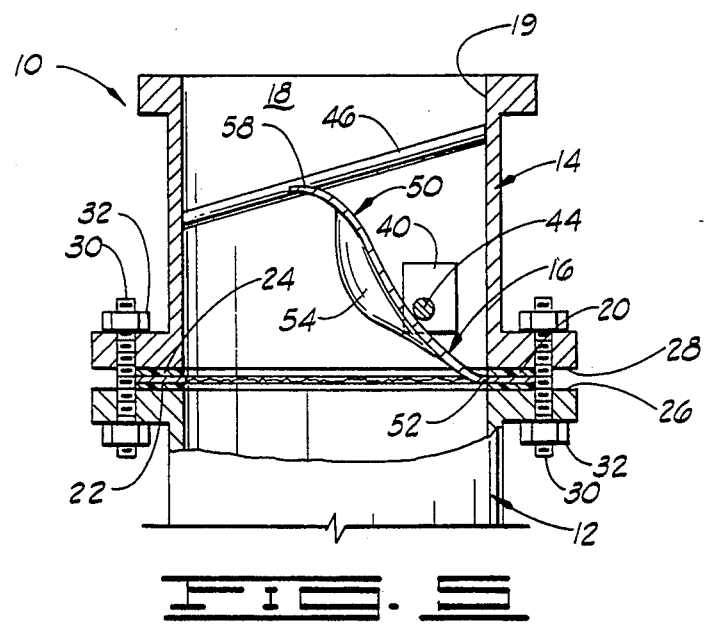
FIG. 5 is a side, partly cross-sectional view similar to FIG. 1 taken along line 5—5 of FIG. 4.

Referring now to the drawings, a presently preferred embodiment of the invention and its operation are illustrated. Like reference numerals refer to like parts throughout the drawings and this description.

Referring now specifically to FIGS. 1-3 of the drawings, a presently preferred nonfragmenting rupture disk assembly of the present invention is illustrated and generally designated by the numeral 10. The assembly 10 is comprised of an inlet rupture disk supporting member 12, an outlet rupture disk supporting member 14 and a rupture disk 16 sealingly clamped between the inlet and outlet supporting members 14.

The inlet supporting member 12 is connected to a vessel or system (not shown) containing fluid under pressure, and it communicates the fluid pressure to the rupture disk 16. The outlet supporting member 14 includes a pressure relieving fluid flow passageway 18 therethrough. The flow passageway 18 is defined by the cylindrical internal surfaces 19 of the supporting member 14. The supporting member 14 may be open to the atmosphere or it may be connected to a conduit for conducting relieved pressurized fluid to a point of disposal or further processing.

The rupture disk 16 which includes a flat annular portion 20 is sealingly clamped between conventional annular gaskets 22 and 24 which are in turn sealingly clamped between flat complimentary annular surfaces 26 and 28 of the inlet and outlet supporting members 12 and 14, respectively. The inlet and outlet supporting members 12 and 14, with the rupture disk 16 and gaskets 22 and 24 therebetween, are clamped together by a plurality of studs 30 (and nuts 32) disposed through complimentary openings in the supporting members 12 and 14.

In the form illustrated in the drawings, the rupture disk 16 is a single part reverse buckling rupture disk. That is, the rupture disk 16 includes a domed central portion 34 attached to the annular flat portion 20. The convex side of the domed portion 34 faces the inlet supporting member 12 and the pressurized fluid contained therein. As shown best in FIG. 3, the rupture disk 16 includes a C-shaped score 36 formed in the annular flat portion 20 thereof. The C-shaped score 36 produces a line of weakness in the rupture disk 16 which causes the rupture disk 16 to rupture into a hinged substantially circular blow-out portion when the design rupture pressure of the rupture disk 16 is equaled or exceeded by the fluid pressure exerted thereon. The term "design rupture pressure" when referring to a rupture disk is used herein to mean that fluid pressure which when exerted on the rupture disk causes it to rupture. The design rupture pressure of a particular rupture disk depends on a number of factors well known to those skilled in the art, some of which are the disk size and shape, the thickness and strength of the material from which the disk is formed, the character of lines of weakness formed in the disk, etc. While the rupture disk 16 described herein and shown in the drawings is a single part reverse buckling rupture disk having a C-shaped score formed thereon, it will be understood that other single part flat and conventional disks as well as composite disks can be utilized in accordance with this invention. A suitable composite disk can, for example, be of the type illustrated in U.S. Pat. No. 4,236,648 mentioned above whereby instead of a C-shaped line of weakness formed in the rupture disk, a C-shaped cutting edge is provided for severing the disk into a hinged blow-out portion of generally circular shape. As will be further understood by those skilled in the art, a variety of configurations of one or more lines of weakness or cutting edges can be utilized to form one or more hinged blow-out portions of different shapes.

As mentioned above, the nonfragmenting rupture disk assemblies and methods of the present invention are particularly suitable in applications where the rupture disk 16 has a relatively large diameter and low design rupture pressure. Such large diameter, low pressure rupture disks generally have a diameter in the range of from about 6 to about 36 inches, a design rupture pressure of from about ½ to about 10 psig and are formed of relatively thin metal, e.g., metal having a thickness in the range of from about 0.002 to about 0.030 inches.

When ruptured into a hinged blow-out part, the blow-out part is relatively easily moved and fragmented by the pressure relieving fluid flow through the ruptured disk and outlet supporting member.

When a rupture disk ruptures into a hinged blow-out part, the blow-out part is folded at the hinge area thereof into the outlet supporting member as a result of the pressure relieving rupture and fluid flow through the ruptured disk. If the kinetic energy of the blow-out portion is not absorbed in some way while the blow-out portion is being folded into the outlet supporting member, it can and often does tear off at the hinge area. Even when the kinetic energy of the blow-out portion is partially absorbed by bending the blow-out portion as it moves into the outlet supporting member, if the leading edge of the blow-out portion, i.e., the part of the blow-out portion opposite the hinge thereof, is not caught and locked in place, the force of the pressure relieving fluid flowing through the ruptured disk and through the outlet supporting member causes the blow-out portion to be moved or whipped about within the outlet supporting member. This in turn can cause the blow-out portion to fragment and loose pieces to be formed.

In accordance with the present invention, bending means comprised of one or more protrudent members are disposed within the outlet supporting member to impact with and bend the hinged blow-out portion of the rupture disk as the blow-out portion folds into the outlet supporting member. The bending of the blow-out portion absorbs kinetic energy from the blow-out portion and prevents tearing at the hinged area thereof. In addition, catching means are disposed in the outlet supporting member for catching the leading edge of the blow-out portion as it is folded into the outlet supporting member thereby preventing the subsequent movement and tearing of the blow-out portion.

Referring again to FIGS. 1-3, the bending means disposed within the outlet supporting member 14 are comprised of a pair of protrudent parts 40 and 42 which protrude into the pressure relieving fluid flow passageway 18 within the supporting member 14. In addition, an elongated member 44 is attached between the protrudent members 40 and 42 for bending the blow-out portion as will be described in detail hereinbelow.

The catching means disposed within the outlet supporting member 14 are comprised of a slanted elongated member 46 positioned within the outlet supporting member 14 across the pressure relieving flow passageway 18. The catching member 46 is positioned so that as the hinged blow-out portion of the rupture disk 16 folds into the outlet supporting member 14, the leading edge of the blow-out portion impacts the elongated member 46, slides along the member into contact with an internal surface 19 of the supporting member 14 and locks between the member 46 and the internal surface 19 as will be described in detail hereinbelow.

Referring now to FIGS. 4-7, the operation of the assembly 10 is illustrated. That is, as shown in FIGS. 4 and 5, after reversal and rupture, the rupture disk 16 forms a substantially circular blow-out part 50 by tearing along the lines of weakness formed by the score 36. The blow-out portion 50 remains attached to the rupture disk 16, and is folded inwardly about an unscored hinge area 52.

As the blow-out portion 50 is folded into the outlet supporting member 14 across the pressure relieving fluid flow passageway 18 therewithin, it impacts the protrudent members 40 and 42 and the elongated member 44 extending therebetween whereby opposite side portions 54 and 56 are bent inwardly as shown in FIG. 4. This impacting and bending of the blow-out portion 50 absorbs kinetic energy from the blow-out portion 50. The blow-out portion 50 then impacts the elongated member 46, and the leading edge 58 of the blow-out portion 50, i.e., the edge opposite the hinge area 52, impacts the slanted elongated member 46.

Figure 6:
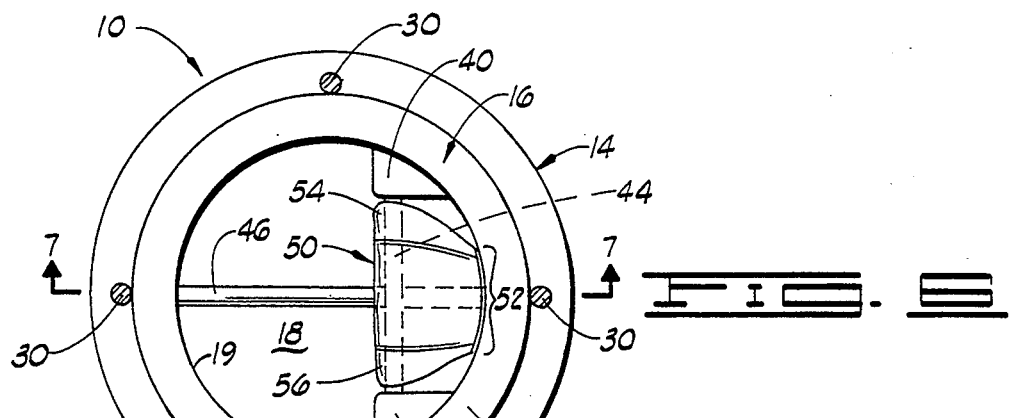
FIG. 6 is a partly sectional view similar to FIGS. 3 and 4, but showing the rupture disk after it has been bent and locked in the fully open position.
Figure 7:
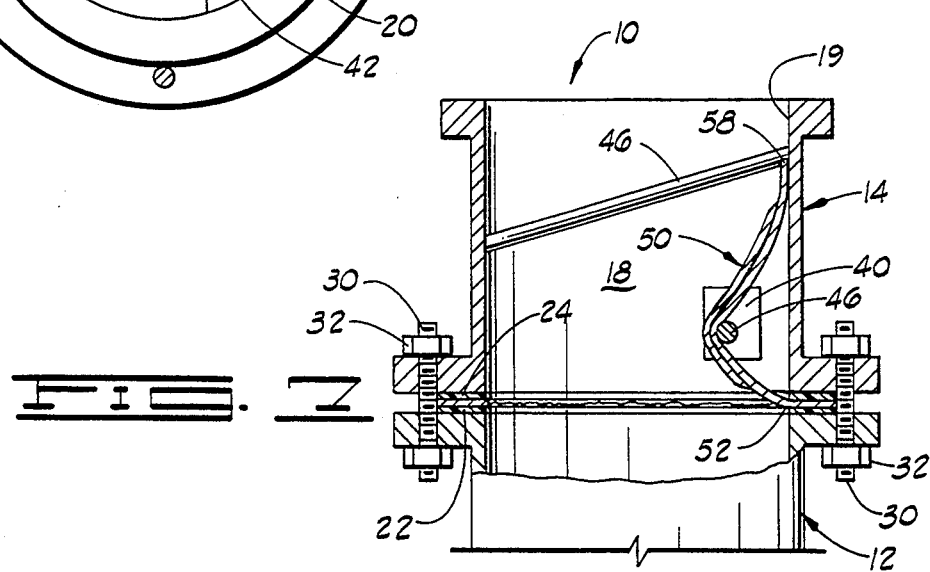
FIG. 7 is a side, partly sectional view similar to FIG. 1 taken along line 7—7 of FIG. 6.

As shown in FIGS. 6 and 7, the continued movement of the blow-out portion 50 causes it to be bent around the bending member 46, and causes the leading edge 58 thereof to slide along the elongated slanted catching member 46 to the intersection of the member 46 with the internal surface 19 of the supporting member 14. The catching member 46 is slanted upwardly over the arc through which the leading edge 58 moves, and when the leading edge reaches the intersection of the member 46 and the surface 19, it is locked in place whereby it can not be moved or whipped about by the flow of pressure relieving fluid through the supporting member 14. That is, once the leading edge 58 is forced into the acutely angled corner between the member 46 and the surface 19, it is prevented from moving in the opposite direction by the downward slope of the member 46. Further, the folded parts 54 and 56 of the blow-out portion 50 and the bending of the blow-out portion 50 around the bending member 46 provide rigidity to the blow-out portion 50 which in combination with the locked in place leading edge 58 prevent the subsequent movement of the blow-out portion 50.

As will now be understood by those skilled in the art, the bending of the blow-out portion 50 as a result of impacting the protrudent members 40, 42 and 46 absorbs kinetic energy from the blow-out portion 50 and prevents it from being torn away from the rupture disk 16 at the hinge area 52. The impact of the leading edge 58 with the elongated catching member 46 also absorbs kinetic energy by bending the leading edge 58, but more importantly, when the leading edge 58 slides along the length of the member 46 and impacts the internal surface 19 of the supporting member 14, it is locked in place and prevented from moving. Thus, as the blow-out portion 50 of the rupture disk 16 is propelled into the outlet supporting member 14 and across the pressure relieving fluid flow passageway 18 therewithin by the pressure relieving fluid flow through the ruptured disk, it is bent, caught and locked in place whereby it is prevented from fragmenting.

The present invention, therefore, is well adapted to meet the need recited above and to carry out the objects and attain the ends and advantages mentioned as well as those inherent therein. While numerous changes can be made in the construction and arrangement of parts, such changes are encompassed within the spirit of this invention as defined by the appended claims.

What is claimed is:

1. A nonfragmenting rupture disk assembly comprising:

an inlet rupture disk supporting member for communicating fluid pressure to said rupture disk;

an outlet rupture disk supporting member including a pressure relieving fluid flow passageway therethrough;

a rupture disk sealingly clamped between said inlet and outlet supporting members which forms a hinged blow-out portion that is folded into said outlet supporting member upon pressure relieving rupture and fluid flow through the ruptured disk; and catching means disposed in said outlet supporting member for catching the leading edge of said blow-out portion as it is folded into said outlet supporting member thereby preventing the subsequent movement and tearing of said blow-out portion as a result of said pressure relieving fluid flow through said ruptured disk and outlet supporting member.

2. The rupture disk assembly of claim 1 which further comprises bending means disposed in said outlet supporting member for bending said blow-out portion of said rupture disk as it is folded into said outlet supporting member thereby absorbing kinetic energy from said blow-out portion.

3. The rupture disk assembly of claim 1 wherein said catching means comprises a slanted elongated member positioned within said outlet supporting member across said pressure relieving fluid flow passageway therethrough whereby as said hinged blow-out portion of said rupture disk folds into said outlet supporting member, the leading edge of said blow-out portion impacts said elongated member, slides along said member and locks between said member and an internal surface of said outlet supporting member.

4. The rupture disk assembly of claim 1 wherein said hinged blow-out portion of said rupture disk formed upon pressure relieving rupture and fluid flow is produced by a line of weakness in said rupture disk.

5. The rupture disk assembly of claim 4 wherein said line of weakness in said rupture disk is C-shaped.

6. The rupture disk assembly of claim 1 wherein said hinged blow-out portion of said rupture disk formed upon pressure relieving rupture and fluid flow is produced by a cutting edge.

7. The rupture disk assembly of claim 6 wherein said cutting edge is C-shaped.

8. The rupture disk assembly of claim 2 wherein said bending means comprises at least one protrudent member disposed in said outlet supporting member which protrudes into said pressure relieving fluid flow passageway therein and impacts with and bends said hinged blow-out portion of said rupture disk as said blow-out portion folds into said outlet supporting member.

9. The rupture disk assembly of claim 8 wherein said bending means includes a plurality of protrudent members which produce a plurality of bends in said blow-out portion of said rupture disk.

10. The rupture disk assembly of claim 2 wherein said rupture disk is a large diameter disk which ruptures at a low fluid pressure.

11. A nonfragmenting large diameter, low pressure rupture disk assembly comprising:

an inlet rupture disk supporting member for communicating fluid pressure to said rupture disk;

an outlet rupture disk supporting member including a pressure relieving fluid flow passageway therethrough;

a large diameter, low pressure rupture disk sealingly clamped between said inlet and outlet supporting members which forms a hinged blow-out portion that is folded into said outlet supporting member upon pressure relieving rupture and fluid flow through the ruptured disk;

bending means disposed in said outlet supporting member for bending said blow-out portion of said rupture disk as it is folded into said outlet supporting member thereby absorbing kinetic energy from said blow-out portion; and catching means disposed in said outlet supporting member for catching the leading edge of said blow-out portion as it is folded into said outlet supporting member thereby preventing the subsequent movement and tearing of said blow-out portion as a result of said pressure relieving fluid flow through said ruptured disk and outlet supporting member.

12. The rupture disk assembly of claim 11 wherein said rupture disk has a diameter in the range of from about 6 to about 36 inches and has a design rupture pressure in the range of from about ½ psig to about 10 psig.

13. The rupture disk assembly of claim 12 wherein said rupture disk is a reverse buckling rupture disk.

14. The rupture disk assembly of claim 11 wherein said catching means comprises an elongated member positioned within said outlet supporting member across said pressure relieving fluid flow passageway therethrough and on a slant with respect to said rupture disk whereby as said hinged blow-out portion of said rupture disk folds into said outlet supporting member, the leading edge of said blow-out portion impacts said elongated member, slides along said member and locks between said member and an internal surface of said outlet supporting member.

15. The rupture disk assembly of claim 11 wherein said hinged blow-out portion of said rupture disk formed upon pressure relieving rupture and fluid flow is produced by a line of weakness in said rupture disk.

16. The rupture disk assembly of claim 15 wherein said line of weakness in said rupture disk is C-shaped.

17. The rupture disk assembly of claim 11 wherein said hinged blow-out portion of said rupture disk formed upon pressure relieving rupture and fluid flow is produced by a cutting edge.

18. The rupture disk assembly of claim 17 wherein said cutting edge is C-shaped.

19. A method of preventing fragmentation of a rupture disk supported between inlet and outlet supporting members during pressure relieving rupture and fluid flow through the ruptured disk and the outlet supporting member comprising:

rupturing said rupture disk into a hinged blow-out portion which is folded into said outlet supporting member by said pressure relieving rupture and fluid flow; and catching the leading edge of said blow-out portion as said blow-out portion is folded into said outlet supporting member whereby said blow-out portion is prevented from moving and tearing as a result of said pressure relieving fluid flow through said ruptured disk and said outlet supporting member.

20. The method of claim 19 which further comprises bending said blow-out portion as it is folded into said outlet supporting member to thereby absorb kinetic energy from said blow-out portion.

21. The method of claim 19 wherein said step of catching the leading edge of said blow-out portion comprises impacting said leading edge on a slanted elongated member disposed within said outlet supporting member whereby said leading edge of said blow-out portion slides along said member after impact and locks between said member and an internal surface of said outlet supporting member.

22. The method of claim 20 wherein said step of bending said blow-out portion comprises causing said blow-out portion to impact at least one protrudent member disposed within said outlet supporting member as said blow-out portion folds into said outlet supporting member.

23. A method of preventing fragmentation of a rupture disk supported between inlet and outlet supporting members during pressure relieving rupture and fluid flow through the ruptured disk and the outlet supporting member comprising:

rupturing said rupture disk into a hinged blow-out portion which is folded into said outlet supporting member by said pressure relieving rupture and fluid flow;

bending said blow-out portion as it is folded into said outlet supporting member to thereby absorb kinetic energy from said blow-out portion; and catching the leading edge of said blow-out portion as said blow-out portion is folded into said outlet supporting member whereby said blow-out portion is prevented from moving and tearing as a result of said pressure relieving fluid flow through said ruptured disk and said outlet supporting member.

24. The method of claim 23 wherein said step of bending said blow-out portion comprises causing said blow-out portion to impact at least one protrudent member disposed within said outlet supporting member as said blow-out portion folds into said outlet supporting member.

25. The method of claim 24 wherein said step of catching the leading edge of said blow-out portion comprises impacting said leading edge on a slanted elongated member disposed within said outlet supporting member whereby said leading edge slides along said member and locks between said member and an internal surface of said outlet supporting member.

26. The method of claim 25 wherein said rupture disk is a large diameter, low pressure rupture disk having a diameter in the range of from about 6 to about 36 inches and has a design rupture pressure in the range of from about ½ psig to about 10 psig.

27. The method of claim 23 wherein said rupture disk includes a line of weakness therein which causes said disk to rupture into a hinged blow-out portion.

28. The method of claim 27 wherein said line of weakness in said rupture disk is C-shaped.

29. The method of claim 28 wherein said rupture disk includes a cutting edge which causes said disk to rupture into a hinged blow-out portion.

30. The method of claim 29 wherein said cutting edge is C-shaped.

* * * * *